United States Patent
Peizner et al.

(10) Patent No.: US 12,554,256 B2
(45) Date of Patent: Feb. 17, 2026

(54) COMMUNICATION AND RELAY SYSTEMS FOR VEHICLES

(71) Applicant: Polaris Industries Inc., Medina, MN (US)

(72) Inventors: Kevin M. Peizner, Vancouver, WA (US); Samir P. Ouahhabi, Battle Ground, WA (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/377,904

(22) Filed: Oct. 9, 2023

(65) Prior Publication Data

US 2024/0045422 A1 Feb. 8, 2024

Related U.S. Application Data

(63) Continuation of application No. 18/073,030, filed on Dec. 1, 2022, now abandoned, which is a continuation of application No. 16/848,280, filed on Apr. 14, 2020, now Pat. No. 11,531,333.

(51) Int. Cl.
  *G05D 1/00* (2024.01)
  *G06F 16/23* (2019.01)
  *H04W 4/46* (2018.01)

(52) U.S. Cl.
  CPC ......... *G05D 1/0022* (2013.01); *G05D 1/0027* (2013.01); *G06F 16/2358* (2019.01); *H04W 4/46* (2018.02)

(58) Field of Classification Search
  CPC .............. G05D 1/0022; G05D 1/0027; H04W 4/00–90; G06F 16/2358
  See application file for complete search history.

(56) References Cited

U.S. PATENT DOCUMENTS

| | | |
|---|---|---|
| 630,819 A | 8/1899 | Sayers |
| 4,715,031 A | 12/1987 | Crawford et al. |
| 6,006,161 A | 12/1999 | Katou |
| 6,640,164 B1 | 10/2003 | Farwell et al. |
| 6,756,697 B2 | 6/2004 | Mizutani et al. |
| 7,263,379 B1 | 8/2007 | Parkulo et al. |
| 8,005,911 B2 | 8/2011 | Jhanji |
| 8,060,400 B2 | 11/2011 | Wellman |
| 8,610,550 B2 | 12/2013 | Hagiwara et al. |
| 9,143,601 B2 | 9/2015 | Padmanabhan et al. |

(Continued)

FOREIGN PATENT DOCUMENTS

| | | |
|---|---|---|
| CN | 108377260 A | 8/2018 |
| CN | 109379726 A | 2/2019 |
| WO | 2020/035249 A1 | 2/2020 |

OTHER PUBLICATIONS

Second Office Action issued by The State Intellectual Property Office of People's Republic of China, dated Jan. 10, 2024, for Chinese Patent Application No. 202110395725.5; 17 pages.

(Continued)

*Primary Examiner* — Aaron L Troost
(74) *Attorney, Agent, or Firm* — Merchant & Gould, P.C.

(57) ABSTRACT

Methods and systems are provided to facilitate information sharing between vehicles. A relay vehicle may be provided which is in communication with a first group of remote vehicles over a first network and a second group of remote vehicles over a second network.

19 Claims, 6 Drawing Sheets

(56) References Cited

U.S. PATENT DOCUMENTS

| | | | |
|---|---|---|---|
| 9,324,195 B2 | 4/2016 | Koenig et al. | |
| 9,494,938 B1 | 11/2016 | Kemler et al. | |
| 9,613,386 B1 | 4/2017 | Arden et al. | |
| 9,644,969 B2 | 5/2017 | Koenig et al. | |
| 9,733,096 B2 | 8/2017 | Colijn et al. | |
| 10,038,977 B2* | 7/2018 | Rentz | G06Q 10/06311 |
| 10,154,377 B2 | 12/2018 | Post et al. | |
| 10,203,220 B2 | 2/2019 | Koenig et al. | |
| 10,565,874 B1 | 2/2020 | Lei et al. | |
| 10,584,977 B2 | 3/2020 | Koenig et al. | |
| 10,595,160 B2 | 3/2020 | Rentz et al. | |
| 10,715,962 B2 | 7/2020 | Liang et al. | |
| 10,856,251 B2 | 12/2020 | Khan et al. | |
| 11,102,612 B2 | 8/2021 | Rentz et al. | |
| 11,209,286 B2 | 12/2021 | Herman et al. | |
| 11,531,333 B2 | 12/2022 | Peizner et al. | |
| 2004/0048598 A1 | 3/2004 | Gagnon | |
| 2005/0222716 A1 | 10/2005 | Tengler et al. | |
| 2007/0005202 A1 | 1/2007 | Breed | |
| 2007/0050095 A1 | 3/2007 | Nelson et al. | |
| 2007/0197230 A1 | 8/2007 | Roggero et al. | |
| 2008/0077309 A1 | 3/2008 | Cobbold | |
| 2008/0084852 A1 | 4/2008 | Karschnia | |
| 2008/0132250 A1 | 6/2008 | Harris | |
| 2010/0069058 A1 | 3/2010 | Rothschild | |
| 2010/0325194 A1 | 12/2010 | Williamson et al. | |
| 2011/0060480 A1 | 3/2011 | Mottla et al. | |
| 2011/0149958 A1 | 6/2011 | Jeon et al. | |
| 2013/0179056 A1 | 7/2013 | Fukuyama | |
| 2013/0279393 A1 | 10/2013 | Rubin et al. | |
| 2014/0210644 A1 | 7/2014 | Breed | |
| 2014/0359131 A1 | 12/2014 | Seed et al. | |
| 2015/0141060 A1 | 5/2015 | Shan et al. | |
| 2016/0139596 A1 | 5/2016 | Na et al. | |
| 2016/0238407 A1 | 8/2016 | Koenig et al. | |
| 2016/0320195 A1 | 11/2016 | Liu et al. | |
| 2016/0321566 A1 | 11/2016 | Liu et al. | |
| 2017/0017734 A1 | 1/2017 | Groh et al. | |
| 2017/0104824 A1 | 4/2017 | Bajwa et al. | |
| 2017/0163746 A1 | 6/2017 | Kawato | |
| 2017/0193627 A1 | 7/2017 | Urmson et al. | |
| 2017/0201850 A1 | 7/2017 | Raleigh et al. | |
| 2017/0230799 A1 | 8/2017 | Wawrowski et al. | |
| 2017/0302774 A1 | 10/2017 | Lei et al. | |
| 2017/0334500 A1 | 11/2017 | Jarek et al. | |
| 2018/0113472 A1 | 4/2018 | Sakr et al. | |
| 2018/0113476 A1* | 4/2018 | Giles | H04W 4/46 |
| 2018/0218613 A1 | 8/2018 | Oesterling et al. | |
| 2018/0234163 A1* | 8/2018 | Yasukawa | H04W 16/26 |
| 2019/0200173 A1 | 6/2019 | Puckette et al. | |
| 2019/0200185 A1 | 6/2019 | Wotton | |
| 2019/0200188 A1 | 6/2019 | Elgee et al. | |
| 2019/0200189 A1 | 6/2019 | Wotton | |
| 2019/0210668 A1 | 7/2019 | Endrizzi et al. | |
| 2019/0265064 A1 | 8/2019 | Koenig et al. | |
| 2019/0306680 A1* | 10/2019 | Doggart | H04L 67/12 |
| 2019/0320285 A1 | 10/2019 | Liang et al. | |
| 2020/0010125 A1 | 1/2020 | Peterson et al. | |
| 2020/0209012 A1 | 7/2020 | Koenig et al. | |
| 2021/0166567 A1 | 6/2021 | Cuevas et al. | |
| 2021/0195390 A1 | 6/2021 | Kernwein et al. | |
| 2021/0318680 A1 | 10/2021 | Peizner et al. | |
| 2023/0087564 A1 | 3/2023 | Peizner et al. | |

OTHER PUBLICATIONS

English translation of Second Office Action issued by The State Intellectual Property Office of People's Republic of China, dated Jan. 10, 2024, for Chinese Patent Application No. 202110395725.5; 22 pages.

* cited by examiner

COMMUNICATION AND RELAY SYSTEMS FOR VEHICLES

CROSS-REFERENCE TO RELATED APPLICATIONS

The present application is a continuation of U.S. patent application Ser. No. 18/073,030, filed Dec. 1, 2022, which is a continuation of U.S. patent application Ser. No. 16/848,280, filed on Apr. 14, 2020, now U.S. Pat. No. 11,531,333, titled COMMUNICATION AND RELAY SYSTEMS FOR VEHICLES, the complete disclosures of which are expressly incorporated by reference herein.

FIELD

The present disclosure relates to vehicles and communication systems and relay systems for communicating between vehicles having different communication systems.

BACKGROUND

Vehicles may implement a variety of communication systems for communicating directly or indirectly with other vehicles or systems. These communication systems may be limited to communicating with other vehicles or devices utilizing the same communication system. Exemplary communication systems are disclosed in US Published Patent Application No. 20190265064, filed Dec. 27, 2018, U.S. Pat. No. 10,038,977, and US Published Patent Application No. US20190200173, filed Dec. 12, 2018, the entire disclosures of which are expressly incorporated by reference herein.

SUMMARY

In an exemplary embodiment of the present disclosure, a communication system of a relay vehicle for relaying information is provided, the communication system including a first communication platform of a relay vehicle operable to receive a first communication signal from a first network, the first communication signal including remote vehicle transmission data associated with a remote vehicle, the first communication platform operable to generate an update notification including the remote vehicle transmission data; a second communication platform of the relay vehicle operable to communicate with a second network, the second communication platform operable to receive the remote vehicle transmission data, the second communication platform operable to generate a second communication signal for the second network, the second communication signal including the remote vehicle transmission data; and an electronic controller of the relay vehicle operable to communicate with the first communication platform and the second communication platform, operable to receive the update notification from the first communication platform, and operable to cause the remote vehicle transmission data to be provided to the second network.

In an example, the first communication platform is operable to associate the remote vehicle transmission data to a remote vehicle profile.

In a variation, the update notification includes the remote vehicle profile and the second communication signal includes the remote vehicle profile.

In a variation, a master remote vehicle profile associated with the remote vehicle is maintained for the second network, the remote vehicle profile is associated with the master remote vehicle profile.

In an example, the second communication signal includes relay vehicle transmission data.

In a variation, the second communication platform is operable to store the remote vehicle transmission data at least until the second communication platform prepares the second communication signal for transmission.

In an example, the first communication platform is operable to receive a third communication signal including updated remote vehicle transmission data.

In a variation, the first communication platform is operable to generate a second update notification including the updated remote vehicle transmission data, wherein the electronic controller is operable to receive the second update notification.

In a variation, the electronic controller is operable to periodically cause the second communication platform to provide the updated remote vehicle transmission data to the second network.

In an example, the first communication signal is a radio signal and the first network is a vehicle-to-vehicle network.

In an example, the second communication platform communicates with the second network that is a web-based network.

In an example, the remote vehicle transmission data includes at least one of a remote vehicle identifier, a name, a position, a speed, and a fuel level.

In an exemplary embodiment of the present disclosure, an embodiment of a relay vehicle having a gateway communication system for a network of vehicles is provided, the vehicle including: a data collection device to determine relay vehicle transmission data relating to a relay vehicle; a first communication platform, the first communication platform operable to receive a first signal from a remote vehicle of a first network, the first signal including remote vehicle transmission data relating to the remote vehicle; a second communication platform operable to receive the relay vehicle transmission data and the remote vehicle transmission data provided by the first communication platform, the second communication platform operable to store the remote vehicle transmission data and communicate a second signal to a second network, the second signal including the relay vehicle transmission data and the remote vehicle transmission data.

In an example, the vehicle further includes an electronic controller operable receive the remote vehicle transmission data from the first communication platform and provide the remote vehicle transmission data to the second communication platform.

In a variation, the electronic controller is operable to receive notification from the first communication platform that remote vehicle transmission data has changed.

In an example, the second communication platform is operable to receive a third signal from the second network, the second network including a second network remote vehicle, the third signal including second network remote vehicle transmission data for the second network remote vehicle.

In an example, the remote vehicle transmission data includes a remote vehicle first network identifier associated with the remote vehicle.

In a variation, when the second signal is communicated to the second network and the second network includes a second network remote vehicle identifier associated with the remote vehicle, the second network associates the remote vehicle transmission data with the second network remote vehicle identifier.

In a variation, when the second signal is communicated to the second network.

In an example, the first communication signal is a radio signal and the first network is a radio network.

In an example, the second communication signal is a cellular signal and the second network is a web-based network.

In an example, the remote vehicle transmission data includes at least one of a remote vehicle identifier, a name, a position, a speed, and a fuel level.

In an exemplary embodiment of the present disclosure, a method of relaying information from a first network of vehicles to a second network is provided, the method including: receiving a first communication signal from a remote vehicle via a first communication platform of a relay vehicle, the first communication signal including remote vehicle transmission data; providing the remote vehicle transmission data from the first communication platform to an electronic controller of the relay vehicle; generating a list including the remote vehicle transmission data; providing the list to a second communication platform of the relay vehicle; storing the remote vehicle transmission data via the second communication platform; and sending the remote vehicle transmission data via the second communication platform to a second network.

In an example, the method further includes: identifying relay vehicle transmission data; providing the relay vehicle transmission data to the second communication platform; and sending the relay vehicle transmission data via the second communication platform to the second network such that the remote vehicle transmission data is sent with the relay vehicle transmission data.

In a variation, providing the remote vehicle transmission data from the first communication platform to an electronic controller of the relay vehicle includes providing a remote vehicle first network identifier associated with the remote vehicle.

In a variation, the method further includes associating the remote vehicle first network identifier to a remote vehicle second network identifier of the second network.

In a variation, the method further includes generating a remote vehicle second network identifier of the second network associated with the remote vehicle and associating the remote vehicle first network identifier to the remote vehicle second network identifier of the second network.

In an exemplary embodiment of the present disclosure, a method of communicating relayed information from a vehicle to a network of vehicles is provided, the method including: receiving a first signal including relay vehicle transmission data associated with a relay vehicle and remote vehicle transmission data associated with a remote vehicle, the remote vehicle transmission data being provided to a first communication platform of the relay vehicle via a first network, the remote vehicle transmission data including a remote vehicle first network identifier, the remote vehicle transmission data being provided to a second communication platform of the relay vehicle, the second communication platform in communication with a second network, the second network receiving the first signal; associating the remote vehicle transmission data with a remote vehicle second network identifier; associating the relay vehicle transmission data with a relay vehicle identifier; and transmitting the remote vehicle transmission data and the relay vehicle transmission data to a network of vehicles.

In an example, the method further includes creating the remote vehicle second network identifier when the remote vehicle is unidentified on the second network.

In an example, the method further includes receiving updated remote vehicle transmission data, and updating the remote vehicle second network identifier with the updated remote vehicle transmission data.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

DETAILED DESCRIPTION OF THE DRAWINGS

Figure 1:
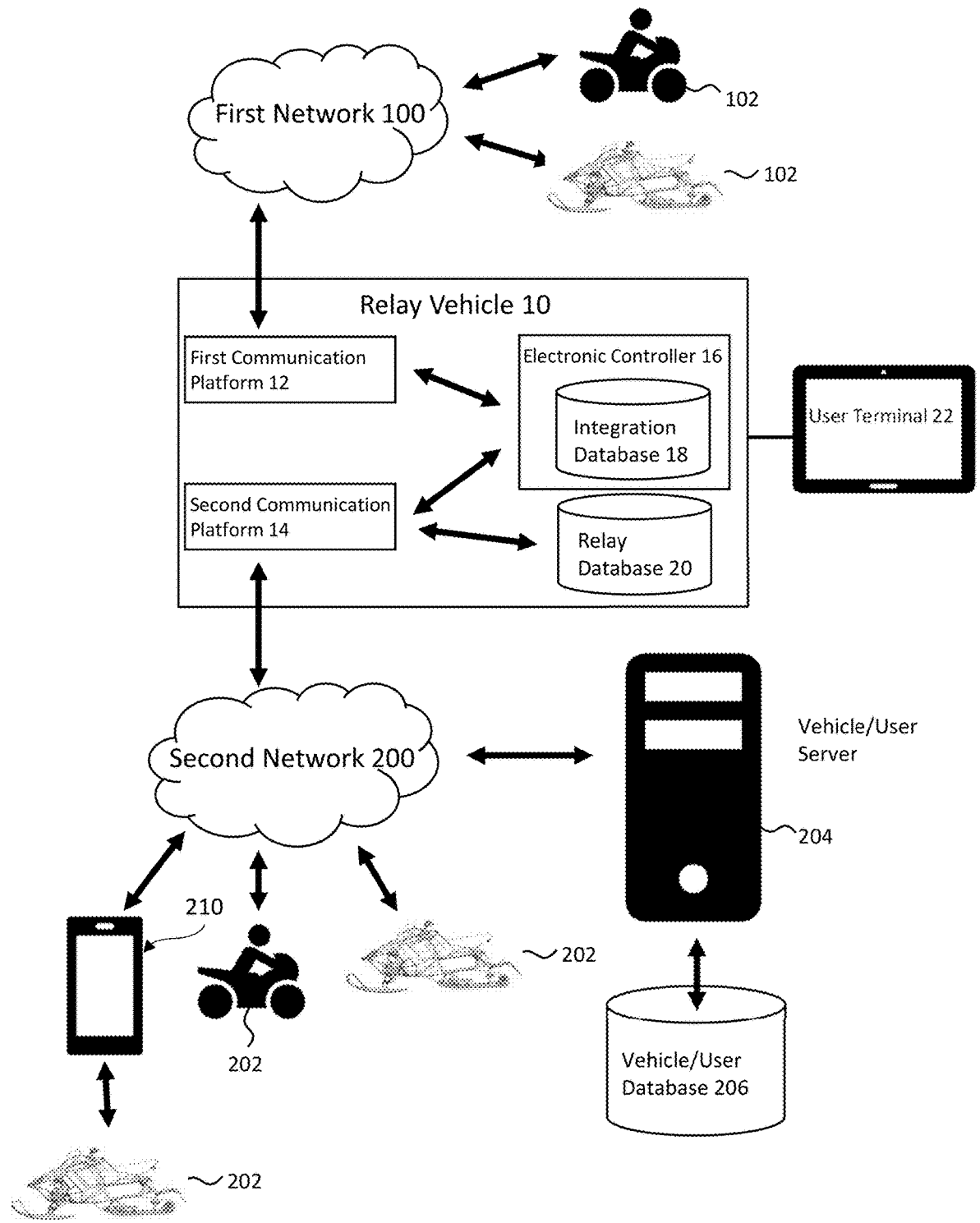
FIG. 1 shows a relay vehicle for relaying information from a first communication platform to a second communication platform, according to one embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, and examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computing device, and/or (2) a sequence of computer implemented steps, operations, or procedures running on a programmable circuit within a directory system, database, or compiler.

As is described herein the present disclosure relates to systems and methods for relaying information or data from one communication platform to another communication platform. The relaying and integration of the data from the various communication systems provides users the ability to communicate data between the various communication systems without requiring each system to incorporate specific hardware and software for each mode of communication.

Because various recreational vehicles incorporate various communication systems or platforms, the systems and methods described herein may be implemented with recreational vehicles to effectively combine for communication of information two networks of recreational vehicles that would otherwise be excluded from communicating with each other.

It is understood that the communication systems and platforms discussed herein are referred to as examples, and the present disclosure is to be read to include any communication system or platform as appropriate.

Referring to FIG. 1, a relay vehicle 10 is provided. Exemplary vehicles include recreational vehicles for use on-road and/or off-road. Exemplary recreational vehicles include snowmobiles, side-by-side vehicles, ATVs, motorcycles, watercraft, and other suitable vehicles. Exemplary recreational vehicles are disclosed in U.S. patent application Ser. No. 16/244,462, filed Jan. 10, 2019, entitled VEHICLE, published as U.S. Pat. Pub. No. 2019/0210668, and U.S. patent application Ser. No. 16/576,305, filed Sep. 19, 2019, entitled SIDE-BY-SIDE VEHICLE, published as U.S. Pat. Pub. No. 2020/0010125, the entire disclosures of which are expressly incorporated by reference herein.]

The relay vehicle 10 includes a first communication platform 12 and a second communication platform 14. The first communication platform 12 is operable to communicate with a first network 100 and the second communication platform 14 is operable to communicate with a second network 200. In one embodiment the first network 100 may be a vehicle-to-vehicle communication network. Vehicle-vehicle communication networks may be used to allow vehicles to communicate certain information or data with one another. For example, vehicles implementing a vehicle-to-vehicle communication system may share transmission data, such as vehicle data, environmental data, and user date. Vehicle data may include, but is not limited to, vehicle identifiers, speed, bearing, location, fuel levels, engine RPM, engine temperature, and so forth. Environmental data may include, but is not limited to, air ambient temperature, humidity, wind speed, and so forth. User data may include, but is not limited to user defined messages, predefined messages, text, user-initiated SOS, auto-initiated SOS, and so forth. Vehicle-to-vehicle communication may utilize various direct communication systems such as, but not limited to, wireless radio networks. Such vehicle-to-vehicle communication systems may be desirable for recreational vehicles, as recreational vehicles are often taken to areas where common wireless communication infrastructure is not available. Any number of communication systems may be implemented, whether direct or indirect, including but not limited to, radio, cellular, satellite, and so forth.

In one embodiment, the first network 100 is a vehicle-to-vehicle communication system via which a plurality of remote vehicles 102 communicate with each other. For example, with recreation vehicles, the remote vehicles 102 may join a first network 100 in order to share information such as location. This may occur when the recreational riders are riding together but may not necessarily want to travel at the same pace or within line-of-sight (e.g., because of dust or snow being kicked up by the vehicles), the riders want to share statistics, the riders want to share route information, and so forth. The remote vehicles 102 communicating via the first network 100 may be able to view the shared information via a user terminal 22 (e.g., an infotainment system). The user terminal 22 may include (e.g., display) data received from the remote vehicles 102. The user terminal 22 may provide the data to the user in various formats, including, but not limited to, maps, lists, notifications, and so forth. For example, when one of the remote vehicles 102 is running low on fuel, the other riders in the first network 100 may be notified of the fuel status of the low-fuel remote vehicle 102. Various networks, including vehicle-to-vehicle networks are disclosed in U.S. patent application Ser. No. 16/217,450, filed Dec. 12, 2018, entitled COMMUNICATION SYSTEM USING VEHICLE TO VEHICLE RADIO AS AN ALTERNATE COMMUNICATION MEANS, published as U.S. Pat. Pub. No. 2019/0200188, the entire disclosure of which is expressly incorporated by reference herein. It is understood that vehicle-to-vehicle networks may include hybrid networks implementing various technologies and configurations. It is noted that a vehicle-to-vehicle network is provided only as an example, and therefore should not be read to limit the scope of networks that may be implemented with regard to the first network 100.

In one embodiment, the second network 200 is a cloud-based network via which a plurality of remote vehicles 202 communicate with each other. For example, with recreation vehicles, the remote vehicles 202 (either a controller of the vehicle 202 itself or a controller of the vehicle 202 through a link with a personal mobile device 210, such as a mobile phone) may join a second network 200 in order to share information such as location. This may occur when the recreational riders are riding together but may not necessarily want to travel at the same pace or within line-of-sight (e.g., because of dust or snow being kicked up by the vehicles), the riders want to share statistics, the riders want to share route information, and so forth. The remote vehicles 202 communicating via the second network 200 may be able to view the shared information via a user terminal 22 (e.g., an infotainment system including input and output devices, such as a display). Various networks, including cloud-based networks are disclosed in U.S. patent application Ser. No. 14/770,424, filed Feb. 26, 2014, entitled RECREATIONAL VEHICLE INTERACTIVE TELEMETRY, MAPPING, AND TRIP PLANNING SYSTEM, patented as U.S. Pat. No. 9,644,969; U.S. patent application Ser. No. 15/161,720, filed May 23, 2016, entitled DISPLAY SYSTEMS AND METHODS FOR A RECREATIONAL VEHICLE, published as U.S. Pat. Pub. No. 2017/0334500; U.S. patent application Ser. No. 16/043,514, filed Jul. 24, 2018, entitled RECREATIONAL VEHICLE GROUP MANAGEMENT SYSTEM, published as U.S. Pat. Pub. No. 2019/0110161; U.S. patent application Ser. No. 16/811,458, filed Mar. 6, 2020, entitled RECREATIONAL VEHICLE INTERACTIVE TELEMETRY, MAPPING, AND TRIP PLANNING SYSTEM, filed by Polaris Industries Inc.; U.S. patent application Ser. No. 16/811,865, filed Feb. 26, 2014, entitled RECREATIONAL VEHICLE GROUP MANAGEMENT SYSTEM, filed by Polaris Industries Inc., the entire disclosures of which are expressly incorporated by reference herein. It is understood that cloud-based networks may include hybrid networks implementing various technologies and configurations. It is noted that a cloud-based network is provided only as an example, and therefore should not be read to limit the scope of networks that may be implemented with regard to the second network 200.

Referring again to FIG. 1, in one embodiment the remote vehicles 102 of the first network 100 are unable to communicate to the remote vehicles 202 of the second network 200. However, it may be desirable to be able to communicate with both networks 100, 200 and to provide data between the two networks 100, 200 as the features provided via the two networks 100, 200 may be similar is some embodiments. A relay vehicle 10 may be provided which allows for at least a partial combining of the two networks 100, 200. The relay vehicle 10 may be considered a hybrid vehicle in that the relay vehicle 10 includes a first communication platform 12 that is operable to communicate with the remote vehicles 102 of the first network 100 and a second communication platform 14 that is operable to communicate with the remote vehicles 202 of the second network 200.

The first and second communication platforms 12, 14 are supported by the relay vehicle 10. For example, the first and second communication platforms 12, 14 may be integrated into the relay vehicle 10, such as a radio communication system or a cellular network communication system. The first communication platform 12 includes one or more transmitters, receivers, transceivers, and associated circuitry to send and receive communication signals to/from communication network 100. The second communication platform 14 includes one or more transmitters, receivers, transceivers, and associated circuitry to send and receive communication signals to/from communication network 200. In other embodiments, the relay vehicle 10 may support the first and second communication platforms 12, 14 in that the first and second communication platform 12, 14 may be linked to the relay vehicle 10. For example, the first communication platform 12 may include a radio system that can be implemented in connection with a first network 100 that is a vehicle-to-vehicle network and the second communication platform 200 may include a cellular device that can be linked to the relay vehicle (e.g., linked to an infotainment system either through a corded or wireless connection, such as a Bluetooth™ connection) and communicate with a second network 200 that is a cloud-based network. In embodiments, first network 100 and second network are incompatible meaning that communications sent over the first network 100 are not readable by the second communication platform 14 and that communications sent over the second network 200 are not readable by the first communication platform 12.

Each of the first and second communication platforms 12, 14 may be in communication with an electronic controller 16 which is able to facilitate communication between the first and second communication platforms 12, 14. The electronic controller 16 may include hardware and/or software for facilitating an exchange of information between the first and second communication platforms 12, 14. The electronic controller 16 may be supported by the relay vehicle 10. For example, the relay vehicle 10 may include a computer system (e.g., infotainment system) which is resident on the relay vehicle 10, the computer system including the electronic controller 16. In other embodiments, the electronic controller 16 may be supported by the relay vehicle 10 in that the electronic controller 16 is operable to be connected to the relay vehicle 10 (e.g., a wired or wireless connection to an infotainment system or a portable computing device that can be mounted to or otherwise carried by the relay vehicle 10). The electronic controller 16 may be implemented as code or a module on a computing system, for example the user terminal 22 of the relay vehicle 10.

The electronic controller 16 is operable to receive information (e.g., transmission data) from the first and second communication platforms 12, 14. In some embodiments, the electronic controller 16 includes an integration database 18. When the electronic controller 16 implements an integration database 18, the integration database 18 may include or store data received via the first and second communication platforms 12, 14 relating to the remote vehicles 102, 202. For example, the integration database 18 stores data relating to each of the remote vehicles 102, 202 that are or have participated in the first or second network 100, 200. The information may include, for example, a vehicle identifier, a name, a location, a fuel level, a speed, a bearing, a color, a timestamp, and so forth. The integration database 18 may be operable to create or include a profile for each of the remote vehicles 102, 202. When the electronic controller 16 receives updated information or data relating one or more of the remote vehicles 102, 202, the electronic controller 16 is operable to update the appropriate profile for the remote vehicle 102, 202 represented in the integration database 18. The electronic controller 16 is operable to provide the information or data to the other communication platforms 12, 14 (e.g., information from the first communication platform 12 is provided to the second communication platform 14 via the electronic controller 16). In some embodiments, the electronic controller 16 is operable to periodically provide information to the first and second communication platforms 12, 14. In other embodiments, the electronic controller 16 is operable to provide information to the first and second communication platforms 12, 14 in real-time.

In some embodiments, either or both of the first and second communication platforms 12, 14 may include a relay database 20. The relay database 20 may be incorporated into the first and second communication platform 12, 14, or the relay database 20 may be in communication with the first and second communication platform 12,14. Each of the first and second communication platforms 12, 14 is operable to provide the respective relay database 20 with the information or data that was provided from the other communication platform (e.g., information provided to the second communication platform 14 from the first communication platform 12). For example, when remote vehicle transmission data is received by the first communication platform 12 from the first network 100 and provided to the second communication platform 14, either directly or via the electronic controller 16, the second communication platform 14 may store the remote vehicle transmission data from the first network in the relay database 20. The relay database 20 is operable to store the remote vehicle transmission data until the second communication platform 14 is prepared to communicate with the second network. In this example, the remote vehicle transmission data from the first network 100 is able to be stored separately from the remote vehicle transmission data relating to remote vehicles of the second network 200. Similar to the previously discussed integration database, the relay database 20 may store the remote vehicle transmission data by creating or including a profile for each of the remote vehicles 102, 202, as appropriate. Each profile may be updated as updated information is received relating to the respective remote vehicle 102, 202. The relay database 20 is then operable to provide the information or data to the respective communication platform 12, 14 for relay to the respective network 100, 200.

Example of Data Relay

In embodiments, a relay vehicle 10 is provided which is operable to communicate with a first network 100 and a second network 200. It is understood that the communication with the first and second networks 100, 200 may be a two-way communication. For example, the relay vehicle 10 may provide relay vehicle transmission data to the networks 100, 200 such as speed, location, and so forth. The relay vehicle may also receive remote vehicle transmission data from the first and second networks 100, 200 such as speed, location, and so forth. The relay vehicle transmission data may be collected via various data collection devices, such as sensors, instruments, and functions of the systems present on the relay vehicle (e.g., gps system, speedometer, fuel gauge, and so forth).

The relay vehicle 10 receives by a first communication platform 12 remote vehicle transmission data from a remote vehicle 102 via the first network 100. The first network 100 may be a vehicle-to-vehicle network supported by direct communication via radio between vehicles. Because of limitations inherent to radio communication and regulations requiring frequency hopping, the first network 100 may have limited capability for communicating. For example, because radios operate at one frequency at a time, a static frequency hopping sequence is used to ensure that all remote vehicles 102 remain on the same network 100 together. Accordingly, remote vehicles 102 using the first network 100 are only able to participate in a single network or "group" in a given moment.

When the relay vehicle 10 receives remote vehicle transmission data from the first network 100, the first communication platform 12 reads and parses the remote vehicle transmission data. The remote vehicle transmission data is associated with the respective remote vehicle 102 via a first network remote vehicle identifier. The remote data may be associated with the first network remote vehicle identifier and may include data such as a rider name, speed, heading, fuel level, latitude, longitude, elevation, timestamp, color, and so forth. The first communication platform 12 provides the rider data to a user terminal 22 which can provide an interface (e.g., a screen) for a user to consume the received remote vehicle transmission data. When a new remote vehicle connects to the network 100 and provides its remote vehicle transmission data, a new profile and representation is created for the first communication platform 12 and the user terminal 22. When the first communication platform 12 and user terminal 22 already have a profile, the first communication platform 12 and the user terminal 22 update the old remote vehicle transmission data with the new remote vehicle transmission data (e.g., a representation of the remote vehicle's location is updated on a map for a user terminal 22).

When the remote vehicle transmission data has been received, read, and parsed by the first communication platform 12, the first communication platform 12 provides the remote vehicle transmission data to an electronic controller 16. The remote vehicle transmission data may be passed to the electronic controller 16 as a list of all of the remote vehicle transmission data that is new since the previous instance of the first communication platform 12 providing the remote vehicle transmission data to the electronic controller 16.

The electronic controller 16 receives notification of the remote vehicle transmission data. The electronic controller 16 then updates or creates a local profile associated with each of the remote vehicles 102 for which the first communication platform 12 has provided remote vehicle transmission data. The local profile is updated with the remote vehicle transmission data as discussed previously. The electronic controller 16 then prepares the remote vehicle transmission data to be provided to the second communication platform 14. It is understood that the remote vehicle transmission data discussed to this point in the example is remote vehicle transmission data related to the remote vehicles 102 of the first network, and for simplicity of understanding may be referred to as first network remote vehicle transmission data. It is understood that the electronic controller 16 may be incorporated directly into either the first or second communication platform 12, 14, or may be separate from both. It is also understood that the electronic controller 16 can be incorporated directly into or be separate from the user terminal 22. The first and second communication platforms 12, 14 may also be incorporated directly into or be separate from the user terminal 22. Any number of configurations of these services and components may be implemented.

The second communication platform 14 receives the first network remote vehicle transmission data. The first network remote vehicle transmission data may be received in some embodiments as a list of the first network remote vehicle transmission data, and specifically updated or new remote vehicle transmission data relative to the previous communication of remote vehicle transmission data from the electronic controller 16 to the second communication platform 14. As will be discussed hereafter, the second communication platform 14 is also operable to receive remote vehicle transmission data from a second network 200, separate from the first network 100 and the first network remote vehicle transmission data.

The second communication platform 14 may operate within a cloud-based network where data is shared via a second network 200 (e.g., a cellular network). The cloud-based network includes a vehicle/user server 204. The vehicle/user server 204 is operable to receive, store, update, and provide remote vehicle transmission data to a network of vehicles. Because of the nature of a cloud-based network, various functionalities may be provided to a user. The following is not to be construed as limiting to the overall scope of the disclosure, but is provided as an example of various functionalities of a cloud-based network. The cloud-based network is able to receive and maintain remote vehicle transmission data from remote vehicles 202 even when the remote vehicles 202 are not able to communicate directly with one another. The vehicle/user server 204 is operable to maintain data on all remote vehicles 202 that are able to communicate with the vehicle/user server 204 via the network 200. The vehicle/user server 204 may store the remote vehicle transmission data on a vehicle/user database 206 that includes a profile or master profile for each remote vehicle 102, 202, including data and a profile on the relay vehicle 10. The master profile for each vehicle may be kept and updated based on data provided to the vehicle/user server 204. Because the network of vehicles, in some embodiments, may be large, the second network 200 may allow a user to create groups of remote vehicles 202 for which second network remote vehicle transmission data is desired. These groups may be maintained either on the vehicle/user server 204 or directly by each vehicle 202.

Because the second communication platform 14 may receive remote vehicle transmission data from the first communication platform 12 and the second network 200, in some embodiments, the second communication platform 14 then stores the first network remote vehicle transmission data separate from any second network remote vehicle transmission data that the second communication platform 14 receives.

As previously discussed, the relay vehicle 10 provides relay vehicle transmission data to the second network 200. In order to send the relay vehicle transmission data to the second network 200, the second communication platform 14 builds and sends a web request including a request for second network remote vehicle transmission data for those remote vehicles 202 included in the selected groups. The second communication platform 14 prepare the request such that the relay vehicle transmission data is provided with the request. The second communication platform 14 also prepares the request to include the first network remote vehicle transmission data. The second communication platform 14 is able to periodically send and receive updates to and from the second network 200, including the first network remote vehicle transmission data and the relay vehicle transmission data. Thus, the second communication platform 14 relays the first network remote vehicle transmission data to the second network 200 and consequently the vehicle/user server 204.

The vehicle/user server 204 is operably to receive the first network remote vehicle transmission data. When the vehicle/user server 204 has already created a profile for the first network remote vehicles 102, the vehicle/user server 204 is able to update the profiles with the updated or most recent first network remote vehicle transmission data. Because a profile has been created on the vehicle/user server 204, the first network remote vehicle transmission data may then be provided to all second network remote vehicles 202 via the second network 200. In practice, the second network remote vehicles 202 may select the group which of first network remote vehicles 102 as it would any other group on the second network 200 (e.g., it would appear as another group for the second network remote vehicles 202).

When the vehicle/user server 204 receives first network remote vehicle transmission data for vehicles that do not have a profile on the vehicle/user server 204, the vehicle/user server 204 creates a new profile for each first network remote vehicle 102 that does not have a profile. The profile may include generating a second network identifier. The profile may be "virtual" until an account is created by the user of the first network remote vehicle 102 of the second network and the remote vehicle 102 is associated with the account on the second network 200.

Figure 2:
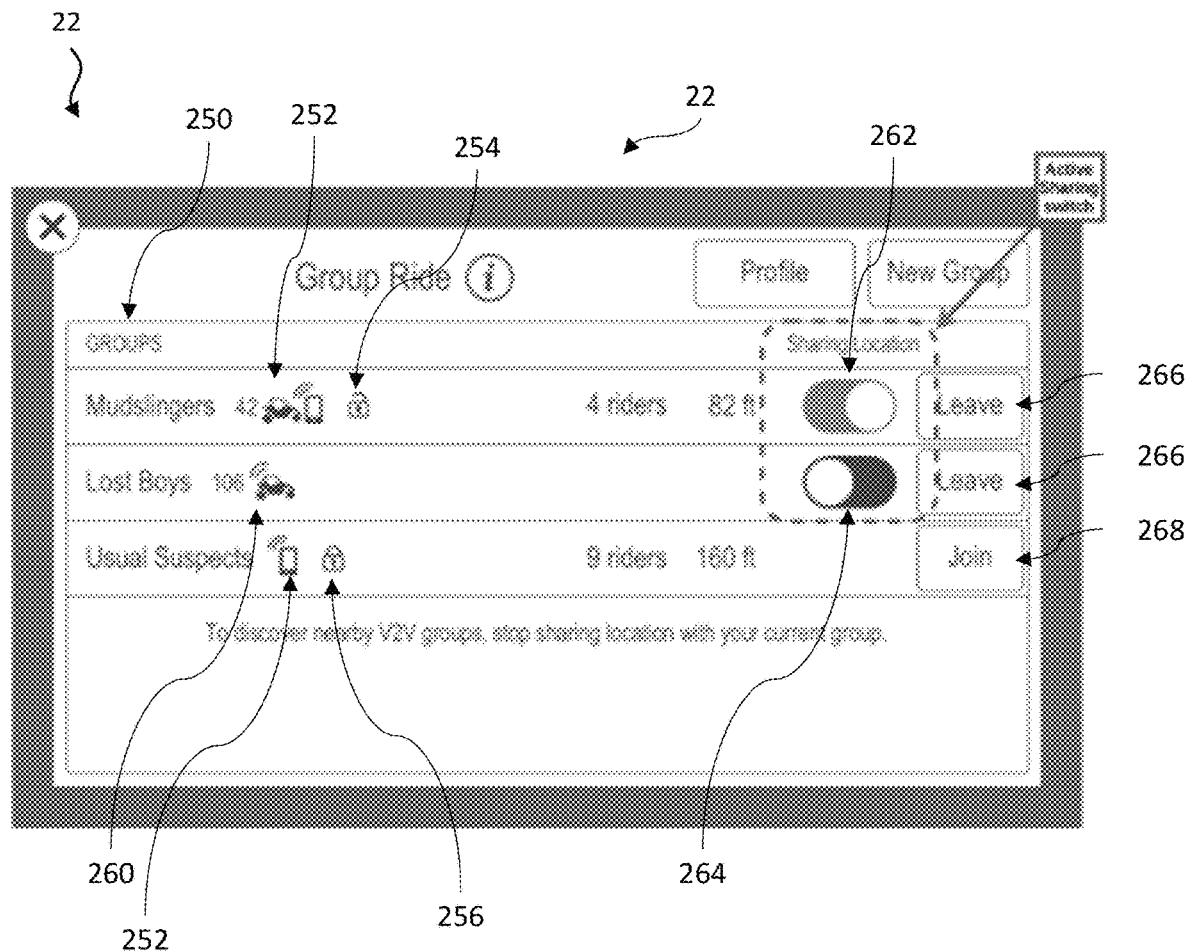
FIG. 2 provides a user terminal such as an infotainment system for selecting with which networks and groups remote vehicle transmission and relay vehicle transmission data will be shared, according to one embodiment.

Referring to FIG. 2, an example of a user terminal 22 is provided. The user terminal 22 may be an infotainment system via which a user may control and select what data may be communicated with which network and which groups. As can be seen in FIG. 12, for example, the user may select which groups will receive the relay vehicle transmission data. In this example, the relay vehicle 10 is connected to a first network 100, where the first network is a vehicle-to-vehicle communication network, and a second network 200, which is a cloud-based communication network. Because the relay vehicle is connected to both networks 100, 200, the relay vehicle will provide the remote vehicle transmission data that it receives from the first network 100 to the second network 200 and from second network 200 to first network 100. Because various groups and networks may be selected, it may be the case that the relay vehicle 10 is not always relaying remote vehicle transmission data from between non-connected networks.

By using a relay vehicle 10, vehicles capable of only vehicle-to-vehicle communication may be incorporated onto a web-based network. This allows vehicles that are capable of only web-based communication to receive data relating to vehicle-to-vehicle communication only vehicles. Various filters and query parameters may be implemented to limit the visibility and data that is provided via the second network 200.

Referring to FIG. 2, three groups 250 of recreational vehicles are shown on the display of user terminal 22 of relay vehicle 10. The groups "Mudslingers" and "Usual Suspects" are both groups that communicate over a first network 100, such as a cloud-based network as indicated by icons 252. "Mudslingers" is a public group as indicated by icon 254 and "Usual Suspects" is a private group as indicated by icon 256. A third group, "Lost Boys", is a group that communicates over a second network 200, as a vehicle-to-vehicle network as indicated by icon 260. The relay vehicle 10 is part of both the "Mudslingers" group and the "Lost Boys" group and is not currently a member of the "Usual Suspects" group. As noted by toggle input 262 being positioned to the right and by toggle input 264 being to the left, relay vehicle 10 is sharing its location data with "Mudslingers", but is not sharing its location data with "Lost Boys". Relay vehicle 10 may leave either of the "Mudslingers" group and the "Lost Boys" group by selecting the respective "Leave" input 266. Further, relay vehicle 10 may request to join the "Usual Suspects" group by selecting the "Join" input 268. Additional details regarding groups and privacy settings are disclosed in disclosed in US Published Patent Application No. 20190265064, filed Dec. 27, 2018, U.S. Pat. No. 10,038,977, and US Published Patent Application No. US20190200173, filed Dec. 12, 2018, the entire disclosures of which are expressly incorporated by reference herein.

Example Methods

Figure 3:
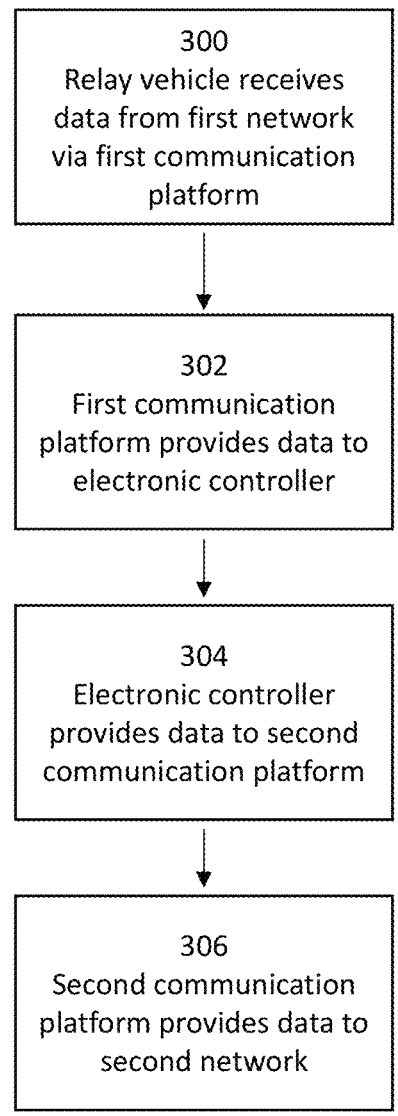
FIGS. 3-6 provide various methods for relaying and providing remote vehicle transmission data between networks, according to some embodiments.

Referring now to FIG. 3, an example method is provided. A method is generally instantiated with receipt of data by a relay vehicle which receives data from a first network via first communication platform, as represented by block 300. The first communication platform provides data to an electronic controller, as represented by block 302. The electronic controller provides data to a second communication platform, as represented by block 304. The second communication platform provides data to second network, as represented by block 306.

Figure 4:
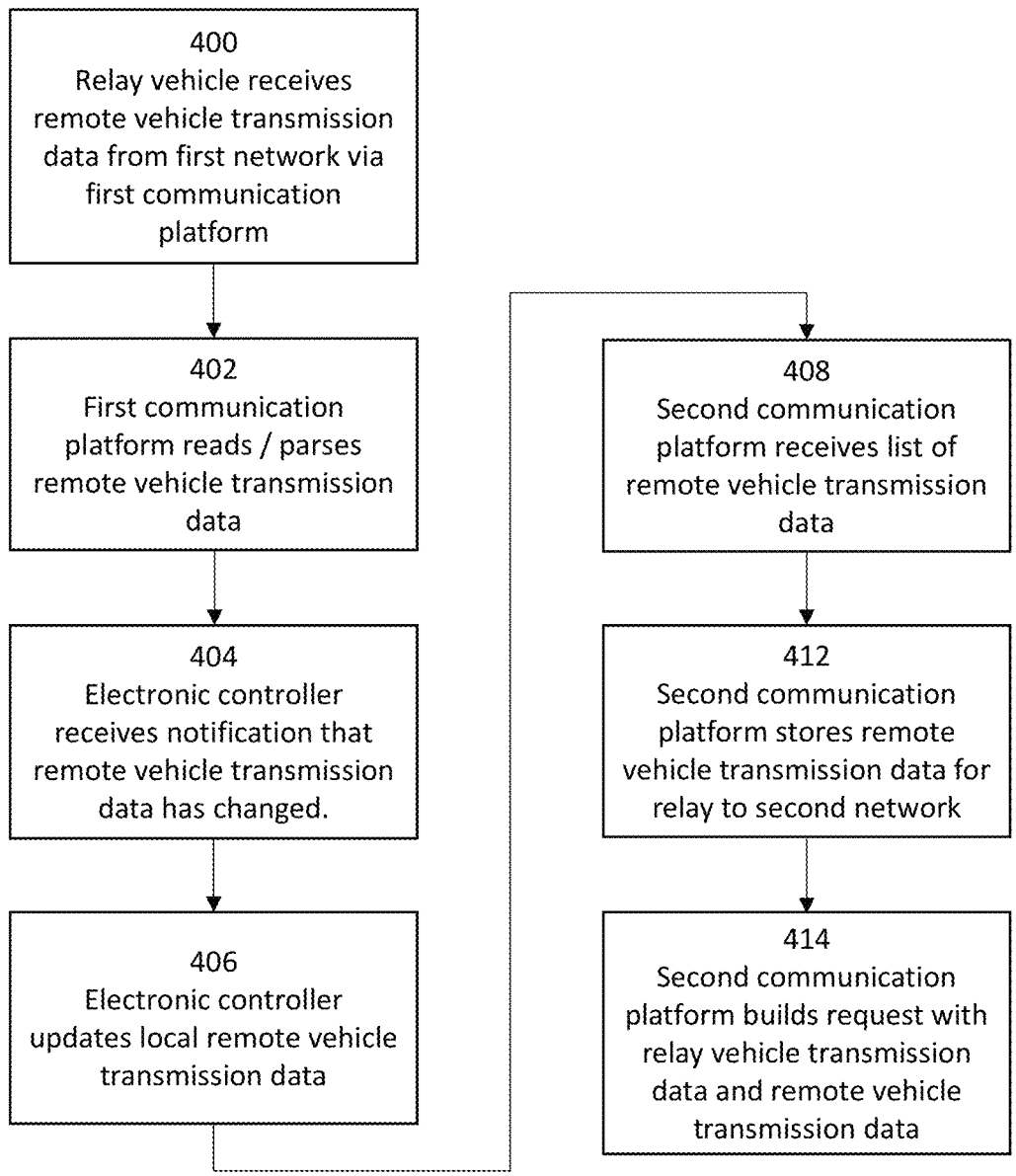

Referring to FIG. 4, in another embodiment, a method includes a relay vehicle receiving remote vehicle transmission data from a first network via a first communication platform, as represented by block 400. The first communication platform reads/parses remote vehicle transmission data, as represented by block 402. The electronic controller receives notification that remote vehicle transmission data has changed, as represented by block 404, such as changes provided by the first communication platform. The electronic controller updates local remote vehicle transmission data, as represented by block 406. The second communication platform receives list of remote vehicle transmission data, as represented by block 408, independent of the second network. The second communication platform stores remote vehicle transmission data for relay to second network, as represented by block 412. The second communication platform builds a request with relay vehicle transmission data and remote vehicle transmission data, as represented by block 414.

Figure 5:
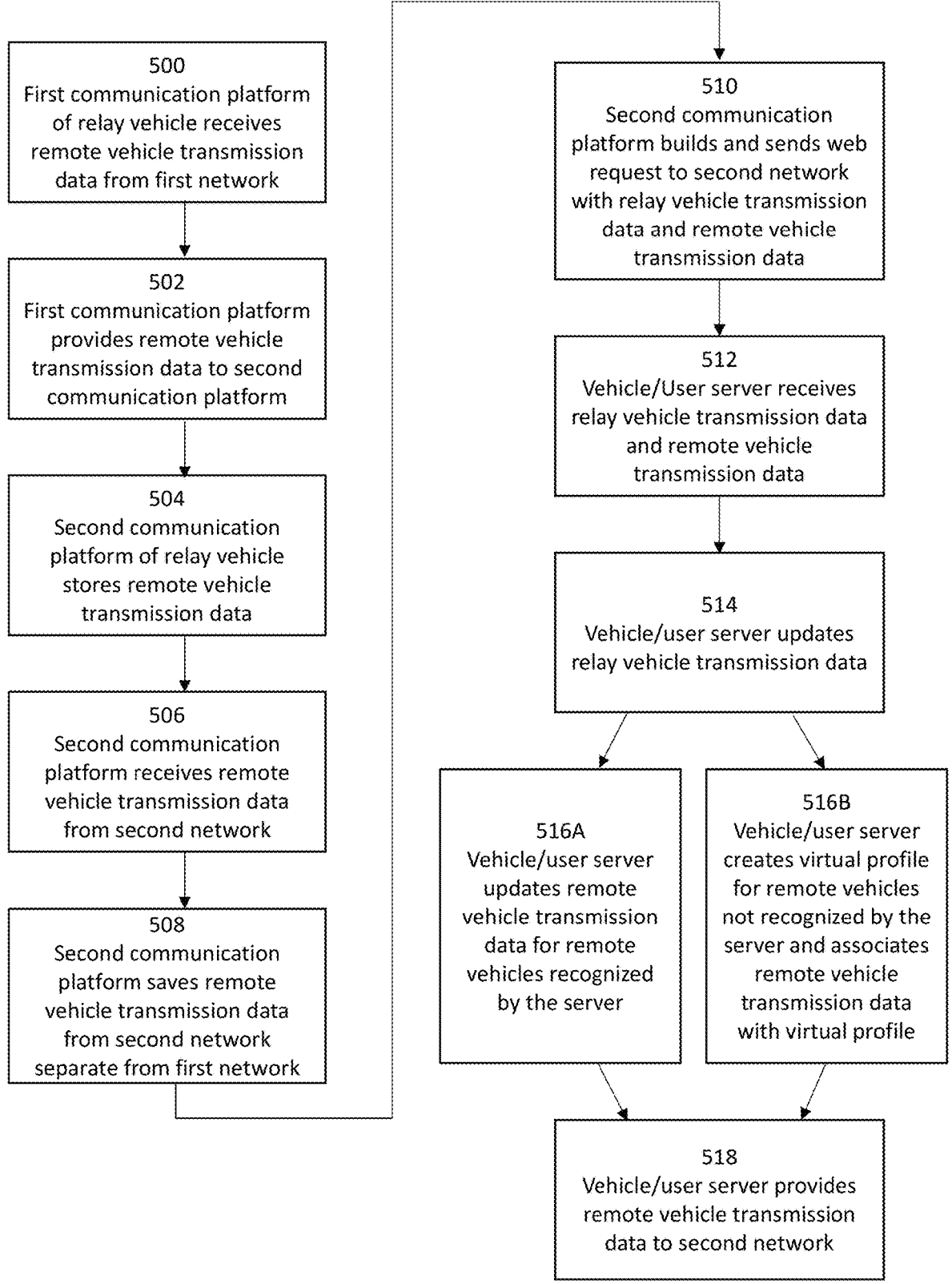

Referring to FIG. 5, in yet a further embodiment, a method includes a first communication platform of a relay vehicle receiving remote vehicle transmission data from a first network, as represented by block 500. The first communication platform provides remote vehicle transmission data to a second communication platform, as represented by block 502. The second communication platform of the relay vehicle stores remote vehicle transmission data, as represented by block 504. The second communication platform receives remote vehicle transmission data from a second network, as represented by block 506. The second communication platform saves remote vehicle transmission data from the second network separate from the first network, as represented by block 508. The second communication platform builds and sends a web request to the second network with relay vehicle transmission data and remote vehicle transmission data, as represented by block 510. A vehicle/user server receives relay vehicle transmission data and remote vehicle transmission data, as represented by block 512. The vehicle/user server updates relay vehicle transmission data, as represented by block 514. The vehicle/user server updates remote vehicle transmission data for remote vehicles recognized by the server, as represented by block 516A. Alternatively or in conjunction, the vehicle/user server creates a virtual profile for remote vehicles not recognized by the server and associates remote vehicle transmission data with the virtual profile, as represented by block 516B. The vehicle/user server provides remote vehicle transmission data to the second network, as represented by block 518.

Figure 6:
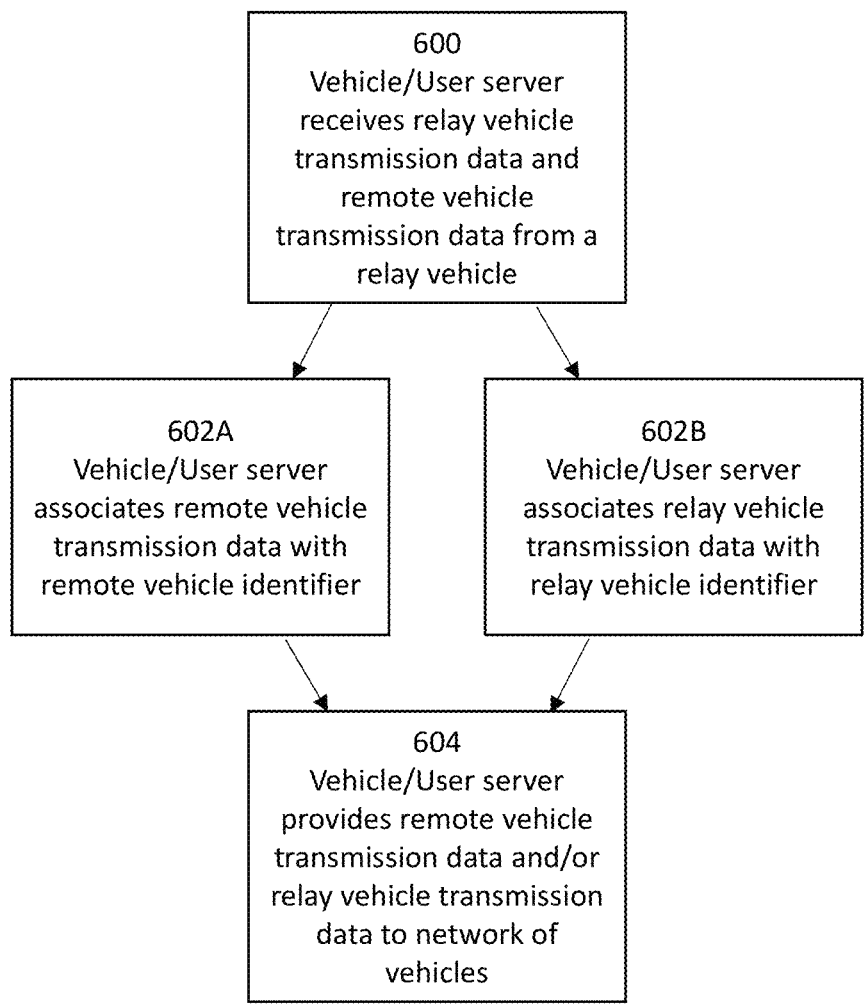

Referring to FIG. 6, in another embodiment, a method includes a vehicle/user server which receives relay vehicle transmission data and remote vehicle transmission data from a relay vehicle, as represented by block 600. The vehicle/ user server associates remote vehicle transmission data with remote vehicle identifier, as represented by block 602A. Alternatively or in conjunction, the vehicle/user server associates relay vehicle transmission data with relay vehicle identifier, as represented by block 602B. The vehicle/user server provides remote vehicle transmission data and relay vehicle transmission data to a network of vehicles, as represented by block 604.

The above-discussed cellular communication system, satellite communication control system, user access system, service providers, and/or backend devices may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices 210 may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11 ac, draft IEEE standard 802.11 ad, and/or draft IEEE standard 802.11 ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module". The term "platform" or the term "controller" may be replaced with the term "circuit." The term "module", "platform", and "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. It is understood that a controller or electronic controller may include a single controller, a plurality of controllers, or a distributed controller.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term "code", as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The apparatuses and methods described in this application may be partially or fully implemented by a special purpose computer created by configuring a general-purpose computer to execute one or more particular functions embodied in code. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:

1. A communication system of a relay vehicle for relaying information, comprising:
   a first communication platform of a relay vehicle operable to receive a first communication signal from a first network, the first communication signal including first remote vehicle transmission data associated with a first remote vehicle, the first communication platform operable to generate an update notification including the first remote vehicle transmission data;
   a second communication platform of the relay vehicle operable to communicate with a second remote vehicle over a second network, the second communication platform operable to receive the first remote vehicle transmission data, the second communication platform operable to generate a second communication signal for the second network, the second communication signal including the first remote vehicle transmission data;

an electronic controller of the relay vehicle operable to receive relay vehicle transmission data from at least one data collection device of the relay vehicle, and further operable to communicate with the first communication platform and the second communication platform, operable to receive the update notification from the first communication platform, and operable to cause the first remote vehicle transmission data and the relay vehicle transmission data to be provided to the second network; and at least one database configured to store:
profile information of at least the first remote vehicle and the second remote vehicle; and
the first remote vehicle transmission data until the second communication platform is prepared to communicate with the second remote vehicle over the second network, the second network being distinct from the first network.

2. The communication system of claim 1, wherein the first communication platform is operable to associate the remote vehicle transmission data to a remote vehicle profile.

3. The communication system of claim 1, wherein at the relay vehicle, a profile is associated with the remote vehicle transmission data, the profile configured to be updated in response to the update notification.

4. The communication system of claim 1, wherein the second communication signal includes relay vehicle transmission data.

5. The communication system of claim 4, wherein the second communication platform is operable to store the remote vehicle transmission data at least until the second communication platform prepares the second communication signal for transmission.

6. The communication system of claim 1, wherein the second communication platform is operable to receive second remote vehicle transmission data from the second remote vehicle over the second network, and the relay vehicle is configured to store the second remote vehicle transmission data separate from the first remote vehicle transmission data.

7. The communication system of claim 1, wherein the electronic controller of the relay vehicle causes the relay vehicle to display a plurality of vehicle groups, wherein at least one vehicle group includes the first remote vehicle and the second remote vehicle.

8. The communication system of claim 1, wherein the electronic controller of the relay vehicle causes the relay vehicle to display an indication, associated with a vehicle group, of whether vehicles included in the vehicle group are configured to communicate via one or more of the first communication platform or the second communication platform.

9. The communication system of claim 1, wherein the electronic controller of the relay vehicle receives a user input from a user interface of the relay vehicle, and, in response to the user input, join at least a first vehicle group and a second vehicle group, wherein the relay vehicle is configured to communicate with one or more vehicles in the first vehicle group via the first interface and communicate with one or more vehicles in the second vehicle group via the second interface.

10. A method of relaying information from a first network of vehicles to a second network, the method comprising:
receiving a first communication signal from a first remote vehicle via a first communication platform of a relay vehicle, the first communication signal including first remote vehicle transmission data;

providing the first remote vehicle transmission data from the first communication platform to an electronic controller of the relay vehicle, the electronic controller communicably coupled to a second communication platform of the relay vehicle;
obtaining a second communication signal from a second remote vehicle via the second communication platform of the relay vehicle, the second communication signal including second remote vehicle transmission data;
determining if the second communication platform is prepared to communicate with the second network;
providing the first remote vehicle transmission data to the second communication platform when the second communication platform is prepared to communicate with the second network;
storing, at the relay vehicle, a first profile including the first remote vehicle transmission data and a second profile including the second remote vehicle transmission data; and
sending the first remote vehicle transmission data via the second communication platform to the second remote vehicle over the second network, the second network being distinct from the first network.

11. The method of claim 10, wherein the remote vehicle transmission data is first remote vehicle transmission data, the method further comprising:
receiving a second communication signal from the second remote vehicle via the second communication platform, the second communication signal including second remote vehicle transmission data.

12. The method of claim 11, further comprising:
storing the second remote vehicle transmission data separate from the remote vehicle transmission data from the first remote vehicle.

13. The method of claim 10, further comprising:
associating the remote vehicle transmission data with a remote vehicle network identifier.

14. The method of claim 10, further comprising:
associating the remote vehicle transmission data with a first profile.

15. The method of claim 14, further comprising:
receiving a first update notification from the first communication platform;
updating the first profile with the first update notification;
sending the first profile to the second remote vehicle over the second network by the second communication platform.

16. A communication system of a relay vehicle for relaying information, comprising:
a first communication platform of a relay vehicle operable to receive a first communication signal from a first network, the first communication signal including first remote vehicle transmission data associated with a first remote vehicle, the first communication platform operable to generate a first update notification including the first remote vehicle transmission data;
a second communication platform of the relay vehicle operable to communicate with a second network, the second communication platform operable to receive the first remote vehicle transmission data, the second communication platform operable to generate a second communication signal for the second network, the second communication signal including the first remote vehicle transmission data, and the second communication platform configured to receive a third communication signal from the second network, the third communication signal including second remote vehicle transmission data associated with a second remote vehicle, the second communication platform operable to generate a second update notification including the second remote vehicle transmission data;

at least one database operable to communicate with each of the first communication platform and the second communication platform, the at least one database configured to store profile information of at least the first remote vehicle and the second remote vehicle and to associate the first remote vehicle transmission data with a first profile and the second remote vehicle transmission data with a second profile, wherein the first remote vehicle transmission data of the first profile includes a first network identifier associated with the first remote vehicle and a fuel level of the first remote vehicle and the second remote vehicle transmission data of the second profile includes a second network identifier associated with the second remote vehicle and a second fuel level of the second remote vehicle; and an electronic controller of the relay vehicle operable to communicate with the first communication platform and the second communication platform, operable to receive the first update notification from the first communication platform and the second update notification from the second communication platform, and operable to cause the first profile to be provided to the second network.

17. The communication system of claim 16, wherein the electronic controller is operable to cause the second profile to be provided to the first network.

18. The relay vehicle of claim 16, wherein the first communication signal is a radio signal and the first network is a radio network.

19. The relay vehicle of claim 16, wherein the second communication signal is a cellular signal and the second network is a web-based network.

* * * * *